United States Patent [19]
Harden et al.

[11] Patent Number: 5,237,162
[45] Date of Patent: Aug. 17, 1993

[54] HANDHELD LASER SCANNER WITH CONTOURED HAND REST

[75] Inventors: Daniel K. Harden; Barbara H. Sauceda, both of Palo Alto, Calif.; Brad R. Reddersen, Eugene, Oreg.; Christopher Lenart, Oakland, Calif.

[73] Assignee: Spectra-Physics Scanning Systems, Inc., Eugene, Oreg.

[21] Appl. No.: 711,541

[22] Filed: Jun. 10, 1991

[51] Int. Cl.$^5$ .............................. G06K 7/10
[52] U.S. Cl. ...................... 235/472; 235/455
[58] Field of Search .................. 235/472, 455

[56] References Cited

U.S. PATENT DOCUMENTS

| | | | |
|---|---|---|---|
| 4,656,345 | 4/1987 | Kurimoto | 235/472 |
| 4,841,129 | 6/1989 | Tawara | 235/472 |
| 4,847,490 | 7/1989 | Nishikama | 235/472 |
| 4,900,907 | 12/1990 | Matusima | 235/472 |

Primary Examiner—Harold Pitts
Attorney, Agent, or Firm—Lyon & Lyon

[57] ABSTRACT

A handheld scanner including a housing with a top head portion and a bottom handle portion with a contoured hand rest portion therebetween. A scanner trigger is located on the top of the top head portion which can be actuated either by a thumb or finger. The angular scanner structure, the trigger location, and the transparent scanning window enables the user to intuitively aim the scanner where the user's finger is aimed. The trigger centerline mark to aid in aiming the scanner at bar codes. A "V"-shaped aiming mark on top of the scanner head also aids in aiming the scanner. The angular shape of the scanner allows it to rest comfortably in the user's hand when being held, or alternately permit it to lie securely on a table without rocking when not being held yet still allow it to be easily picked up by the user.

9 Claims, 1 Drawing Sheet

HANDHELD LASER SCANNER WITH CONTOURED HAND REST

BACKGROUND OF THE INVENTION

The field of the present invention relates to handheld scanners, such as for example laser scanners used to scan bar codes.

SUMMARY OF THE INVENTION

A handheld laser scanner, used for the purpose of non-contact reading of bar codes, emits a scanning line of laser light from an opening on one end of the scanner. The scanner includes a protective housing which incorporates all electronics, optics, light sources, and scanning mechanisms necessary to generate the scanning beam of light, detect the light scattered by the bar code, convert the detected light energy into a digital bit stream, decode the digital information and turn it into a valid bar code, and communicate that information to a data terminal. The housing for the scanner includes a unique-shaped handle portion with a contoured hand rest that allows for easy holding of the scanner, even when not scanning. The scanner includes a trigger which is easily actuated by fingers or the thumb, and which also acts as a means of assisting in the aiming process. The scanner also includes special markings on the top of the scanner which also aid the user in intuitively aiming the scanner toward the bar code.

DESCRIPTION OF THE PREFERRED EMBODIMENTS

The present invention discloses a new type of handheld laser scanner, with features to make it easier for the scanner manufacturer to assemble the unit as well as easier for the scanner user to actuate, aim, and also place the scanner on a table when not in use.

In one embodiment of the invention, the scanner housing described below will enclose the following parts: a laser light source such as a visible laser diode, a focussing means for the light source, a scanning means for the light source, a means of relaying the scanning beam away from the scanner housing so that it hits a target bar code, a means of collecting the light energy scattered by the bar code, a means of converting that light energy into an analog electronic signal representative of the bar code, a means of converting that analog electronic signal into a digital bit stream, a means of translating the digital bit stream into valid bar code information, a means of formatting the bar code data so that it may be understood properly by a data terminal, a means of communicating with a data terminal, and a means of transmitting the scanned bar code data to the data terminal.

Figure 1:
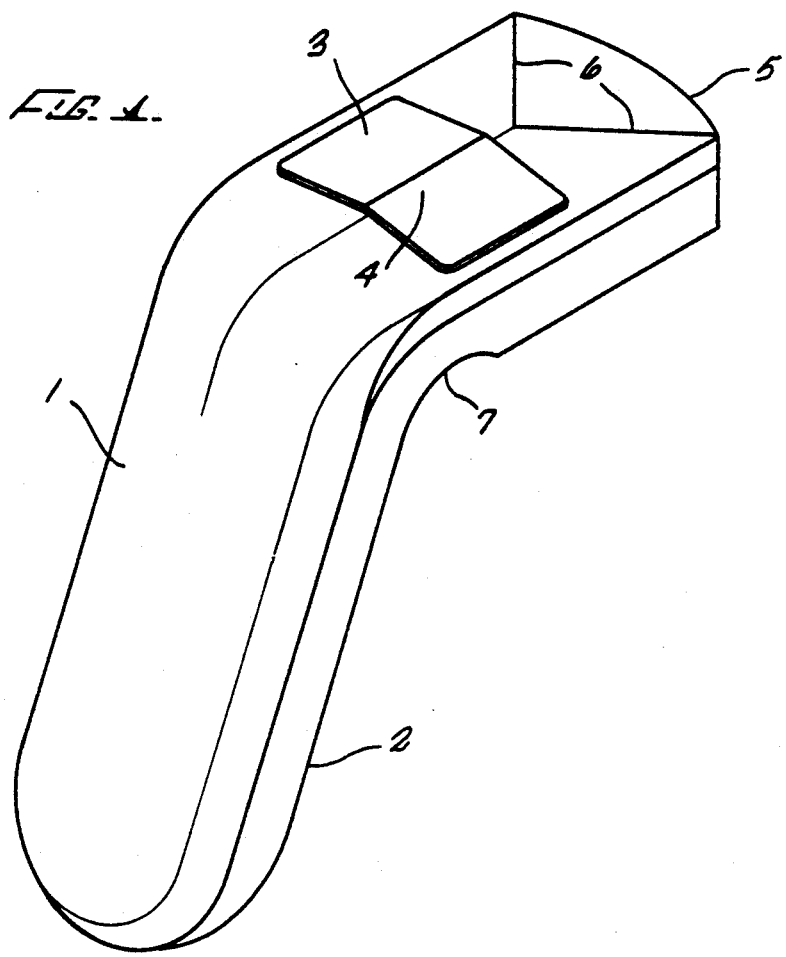
FIG. 1 is a right top side perspective view of a handheld scanner according to the present invention.

Referring to FIG. 1, the scanner of this invention consists of several parts. There is a bottom handle portion 2 connected to a top handle portion 1. The scanning electronics and optics are mounted inside these handle portions 1 and 2. A transparent scanning window 5 is mounted at one end of the scanner just beyond a trigger 3. The output scanning beams exit from transparent scanning window 5. In addition, the light scattered from the bar code during the scanning process is also collected through scanning window 5.

Trigger switch 3 can be actuated either by the thumb or any finger of the hand. It can also be triggered from either side of a trigger centerline 4. When trigger 3 is pushed, it activates all electronics inside the scanner, so that the laser turns on, the scanning mechanism is set in motion, and all analog detection and digital processing electronics are activated. The scanner can now be aimed by the user.

Aiming cues are built into the scanner design in several ways. First of all, trigger centerline 4 is actually molded or painted into the trigger so that centerline 4 lines up with a line running through the center of transparent scanning window's 5 axis and parallel with the general center of the outgoing scanning beam. Second, the very act of triggering requires the user to align his or her finger on the scanner so that the finger is in effect "aimed" at the bar code during the scanning process. Third, there are aiming lines 6 painted or molded on top handle portion 1 so that the center of the "V" of the aiming lines up with the same linear direction as the trigger centerline 4. These aiming lines also open up so that the tips of the "V" are at the two extreme edges of transparent scanning window 5. The combination of all these features aids in the intuitive aiming of the scanner toward the bar code.

Figure 2:
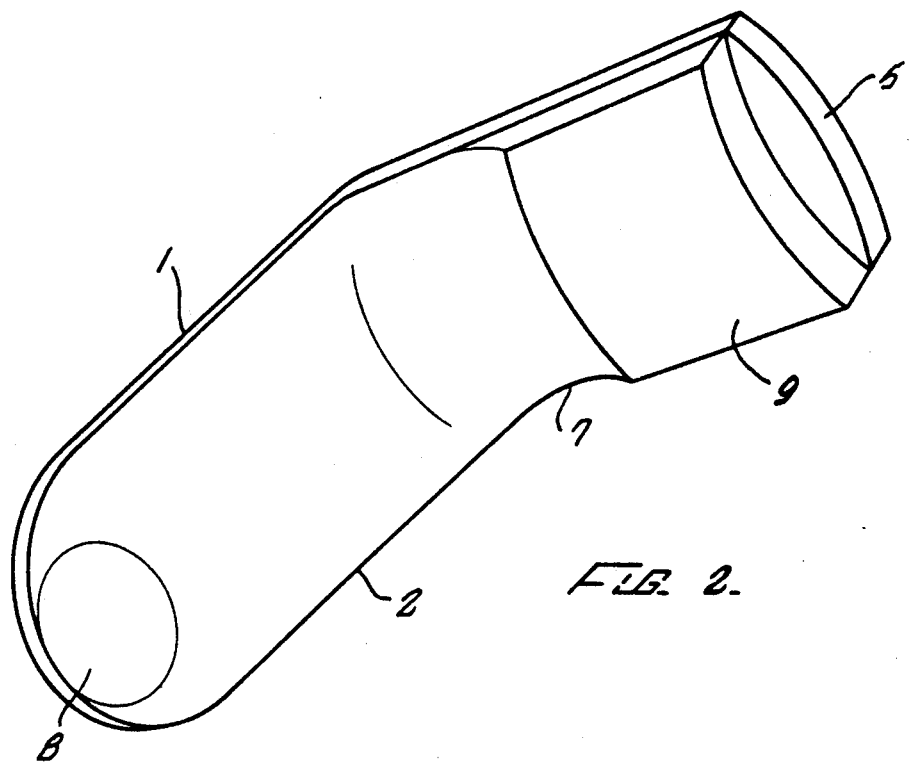
FIG. 2 is a right bottom side perspective view of the handheld scanner of FIG. 1.

The scanner also includes a contoured hand rest 7 built into bottom handle portion 2 of the scanner. Referring to FIG. 2, contoured hand rest 7 is an ergonomically-designed curve in the handle so that there is a tapering of the center of the handle on the underside thereof which is form-fitted to the curve of the human hand. This makes it easy to hold the scanner for long periods of time, and also to make it easy to grip the scanner.

The angular shape of the scanner, also shown in FIG. 2, is another important part of the invention. Because of this tilted shape, the scanner can sit on a beveled handle bottom rest 8 and also touch a handle top rest 9 near the transparent scanning window when put on a table. The angle then is tilted enough so that it is easy for the user to slip his or her hand under the handle and pick it up from the table in a single motion.

One feature of the present invention is the unique shape of the product, which includes a contoured hand rest 7 to make it easier to hold than conventional scanners.

A second feature of the present invention is the use of a scanner trigger 3 on the top of the product, which can be actuated either by a thumb or any other finger.

A third feature of the present invention is that the position of the scanner handle, the trigger, and the transparent scanning window enables the user to naturally point the scanner where his or her finger is aimed, thereby making aiming more intuitive than in other handheld scanners.

A fourth feature of the present invention is the use of a trigger centerline mark to aid in aiming the scanner at bar codes.

A fifth feature of the present invention is the use of a "V"-shaped aiming mark to aid in aiming the scanner at bar codes.

A sixth feature of the present invention is the angular shape of the scanner, which allows it to rest comfortably on a table without rocking when not in use, and still make it easy to pick up.

We claim:

1. A handheld scanner, comprising:

a housing having a top head portion, a bottom handle portion angularly joined to the top head portion, and a contoured, inwardly tapered hand rest portion between the top head portion and the bottom handle portion, the hand rest portion being form-fitted with an outwardly curved portion corresponding to a curve of the human hand;

a transparent window at a forward end of the top head portion;

a beveled bottom rest at a bottom end of the bottom handle portion;

a handle top rest at the forward end of the top head portion, the scanner being supportable on a flat surface in an at rest position on the bottom rest and top rest.

2. A handheld scanner according to claim 1 further comprising a trigger mounted on the top head portion, wherein the trigger is symmetrically positioned about an axial centerline of the top head portion corresponding to the axis of the output scanning beam, the centerline being aligned with the output scanning beam.

3. A handheld scanner as described in claim 1 or 2 further comprising aiming lines positioned on a top surface of the top head portion, the aiming lines formed in a "V" shape, with the "V" bisected along an axial centerline of the top head portion and the legs of the "V" extending forward on either side of the centerline.

4. A handheld scanner according to claim 1 wherein the angular shape of the housing has a sufficient angular tilt to allow a user to slip a hand under the housing and pick it up in a single motion.

5. A handheld scanner according to claim 1 further comprising a trigger mounted on the top head portion, wherein the housing and trigger are constructed and arranged to allow for either thumb or finger activation of the trigger.

6. A handheld scanner comprising:

a bottom handle portion having a beveled handle bottom rest at a rear end thereof;

a top head portion having a transparent scanner window on a forward end thereof;

a trigger means for activating the scanner, the trigger means being symmetrically positioned about an axial centerline on an upper surface of the top head portion;

an aiming line bisecting the trigger means along the centerline of the top head position.

7. A handheld scanner as described in claim 6 further comprising "V" shaped aiming lines positioned on the upper surface of the top head portion, with the "V" bisected along the axial centerline of the top head portion and the legs of the "V" extending forward on either side of the centerline.

8. A handheld scanner according to claim 6 wherein the housing and trigger means are constructed and arranged to allow for either thumb or finger activation of the trigger means.

9. A handheld scanner according to claim 1 wherein the inwardly tapered hand rest portion is along an underside of the scanner between the top head portion and the bottom handle portion.

* * * * *